United States Patent [19]

Park

[11] Patent Number: 5,563,857
[45] Date of Patent: Oct. 8, 1996

[54] DISC CHANGER HAVING A SINGLE DRIVING MOTOR FOR BOTH A TRAY AND A ROULETTE

[75] Inventor: KwangLim Park, Seoul, Rep. of Korea

[73] Assignee: Daewoo Electronics Co., Ltd., Seoul, Rep. of Korea

[21] Appl. No.: 297,944

[22] Filed: Aug. 31, 1994

[30] Foreign Application Priority Data

Aug. 31, 1993 [KR] Rep. of Korea ...................... 93-17277

[51] Int. Cl.$^6$ .................................................. G11B 17/22
[52] U.S. Cl. .......................... 369/37; 369/77.1; 369/75.2
[58] Field of Search ................................. 369/34, 36, 37, 369/75.2, 77.1, 178, 191, 194; 360/98.04, 98.06

[56] References Cited

U.S. PATENT DOCUMENTS

| | | | |
|---|---|---|---|
| 4,755,978 | 7/1988 | Takizawa et al. | 369/37 |
| 5,218,592 | 6/1993 | Isshiki et al. | 369/36 |
| 5,386,403 | 1/1995 | Morioka et al. | 369/37 |

*Primary Examiner*—Stuart S. Levy
*Assistant Examiner*—William R. Korzuch
*Attorney, Agent, or Firm*—Nixon & Vanderhye P.C.

[57] ABSTRACT

A disc changer includes a driving force providing unit, a shaft gear fixedly mounted to the driving force providing unit; a timing belt for transmitting the driving force from the shaft gear; a wheel gear being rotated by the driving force transmitted through the timing belt; a center gear meshed with the wheel gear; an inner/outer gear including an inner gear portion and an outer gear portion formed along inner and outer peripheries thereof, the inner/outer gear is rotatably engaged with the center gear; a plurality of planet gears each mounted in the inner/outer gear and meshed with the center gear and the inner gear portion of the inner/outer gear respectively; a roulette gear engaged with the planet gears; and a tray driving gear meshed with the outer gear portion of the inner/outer gear and a rack gear portion of a tray. Therefore, the disc changer enables a tray and a roulette to be driven by one motor to thereby reduce a product cost and a size thereof.

7 Claims, 6 Drawing Sheets

DISC CHANGER HAVING A SINGLE DRIVING MOTOR FOR BOTH A TRAY AND A ROULETTE

BACKGROUND OF THE INVENTION

1. Field of the Invention

The present invention relates to a disc changer, more roulette on the tray which carry a plurality of discs using one motor.

2. Description of the Prior Art

In general, a disc changer, in which a plurality of discs can be accommodated, includes a tray and a roulette rotatably mounted on the tray. When the tray is ejected from the disc changer in frontward direction, discs can be accommodated on and removed from the roulette on the tray.

In the disc changer, the tray has a longitudinal rack gear portion on a lower portion thereof. A pinion gear being driven by a motor is meshed with the rack gear portion, so that the tray travels in frontward and rearward directions in accordance with the rotation of the pinion gear.

FIG. 1 is a plan view for showing a partial section of an interior structure of a conventional disc changer. Reference numerals 1, 2, and 4 denote a main body, a tray, and a roulette respectively. As shown in FIG. 1, the conventional disc changer includes a tray travel unit 5, a roulette driving unit 6, a driving elevation unit 7 and a driving unit 8 thereby perform frontward/rearward movements of the tray, roulette driving and disc loading operations. In the above conventional disc changer, there exist drawbacks in that the product cost and the size of the disc changer increase since roulette and tray driving units are separately required. Further, the interior structure thereof becomes complicated and appearances thereof look unsightly due to a lot of wires required to connect the units to each other.

SUMMARY OF THE INVENTION

Therefore, an object of the present invention is to provide a disc changer capable of driving a tray and a roulette by one motor to thereby reduce the product cost and the size thereof.

In order to achieve the above objects, in accordance with the present invention, there is provided a disc changer which comprises:

a driving force providing unit; and a tray and roulette driving mechanism for driving a tray and a roulette in accordance with a driving force of the driving force providing unit, wherein the tray and roulette driving mechanism includes:

a shaft gear fixedly mounted to a shaft of the driving force providing unit;

a timing belt for transmitting the driving force from the shaft gear;

a wheel gear being rotated by the driving force transmitted through the timing belt;

a center gear meshed with the wheel gear;

an inner/outer gear having a center hole in a circular groove formed thereon, and including an inner gear portion and an outer gear portion formed along inner and outer peripheries thereof;

a plurality of planet gears each having a center groove, the planet gears each being mounted in the circular groove and meshed with the center gear and the inner gear portion of the inner/outer gear respectively;

a roulette gear having protrusions being correspondingly inserted into each of the center grooves of the planet gears; and a tray driving gear meshed with the outer gear portion of the inner/outer gear and a rack gear portion of tray.

The driving force providing unit may be a motor.

BRIEF DESCRIPTION OF THE DRAWINGS

The above objects and other advantages of the present invention will become more apparent by describing in detail a preferred embodiment thereof with reference to the attached drawings in which.

DESCRIPTION OF THE PREFERRED EMBODIMENT

Figure 1:
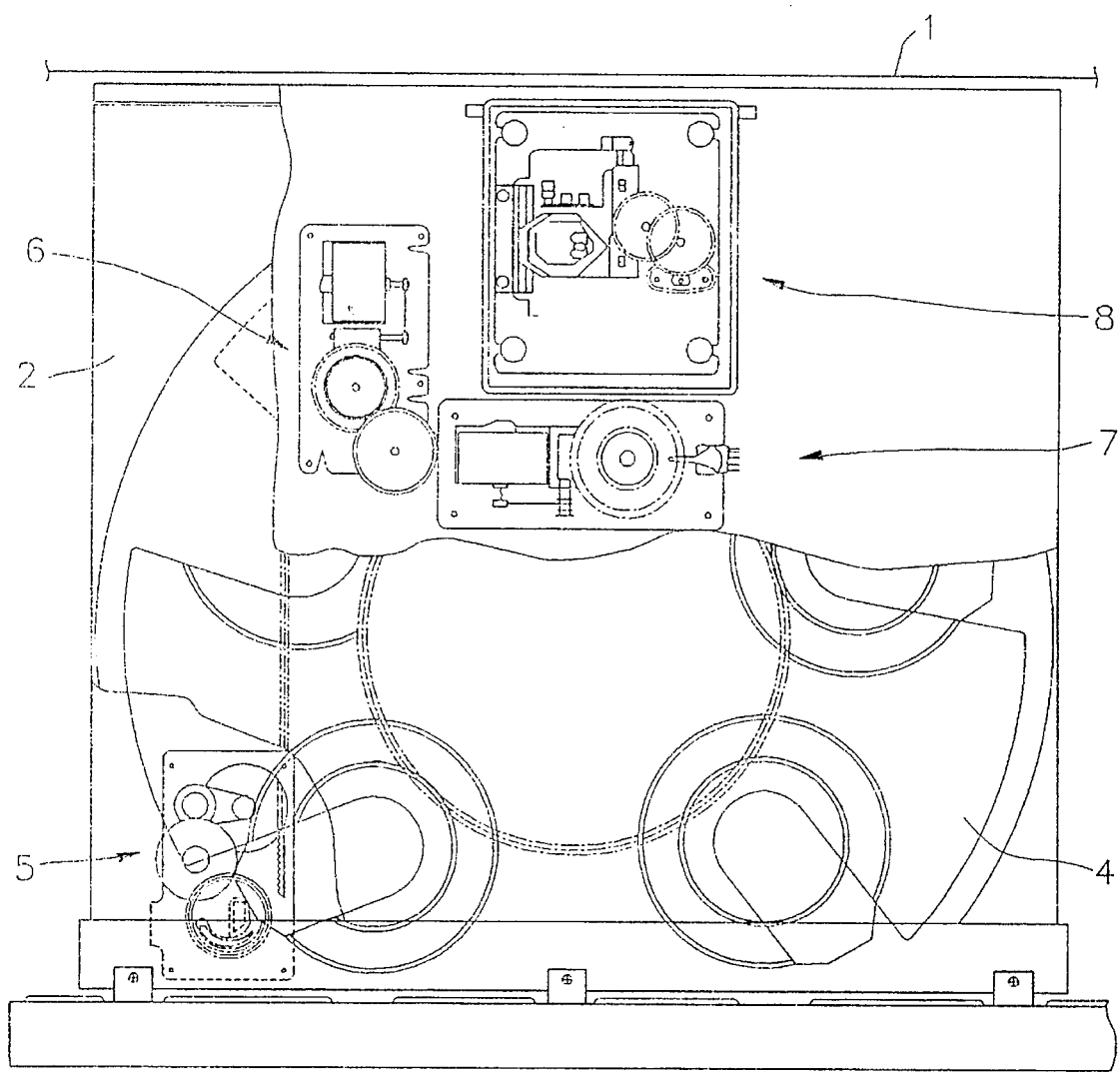
FIG. 1 is a plan view for showing a partial section of an interior structure of a conventional disc changer.
Figure 2:
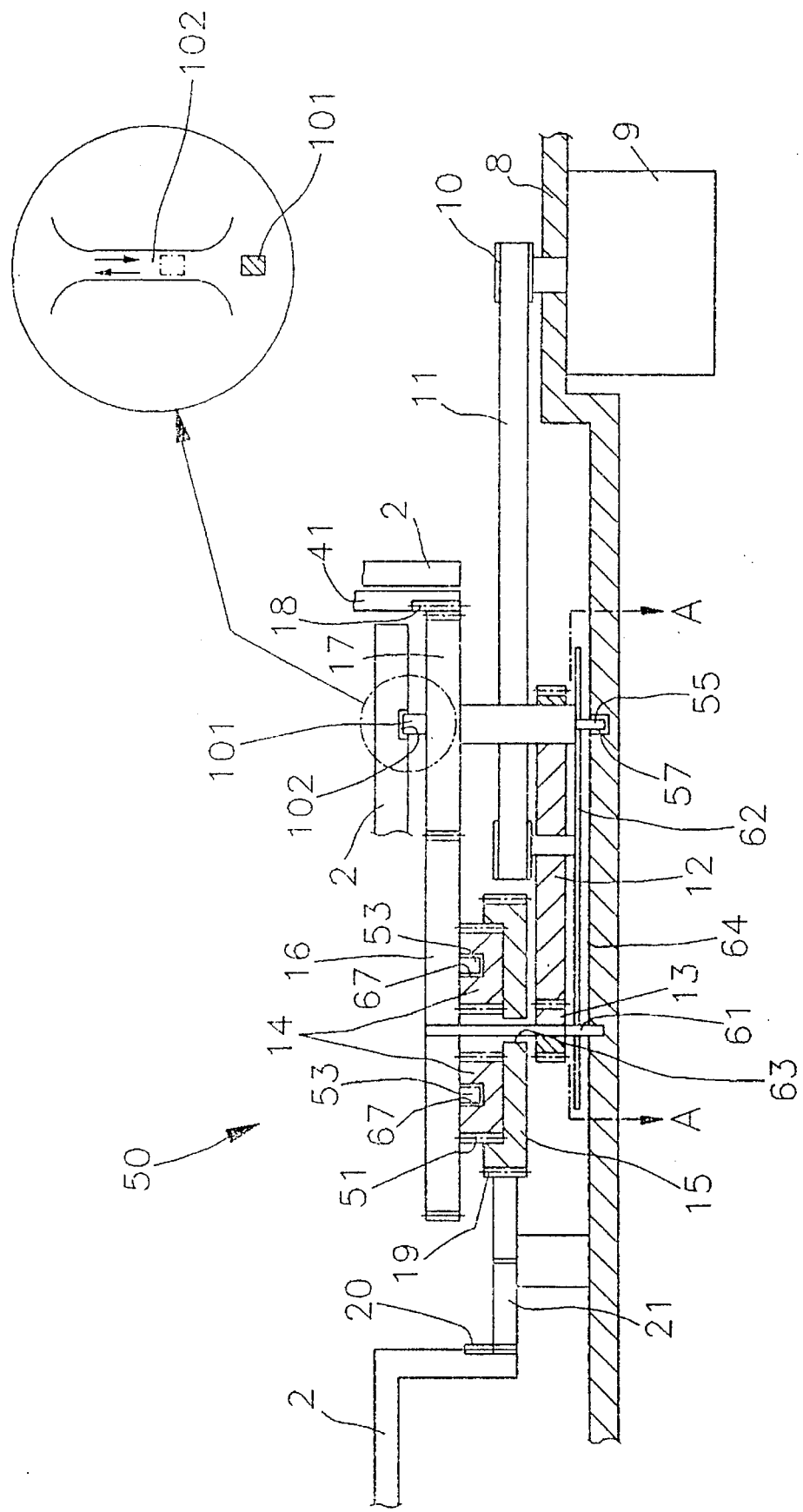
FIG. 2 is a cross-sectional view of the tray and roulette driving mechanism of a disc changer according to the present invention.
Figure 4:
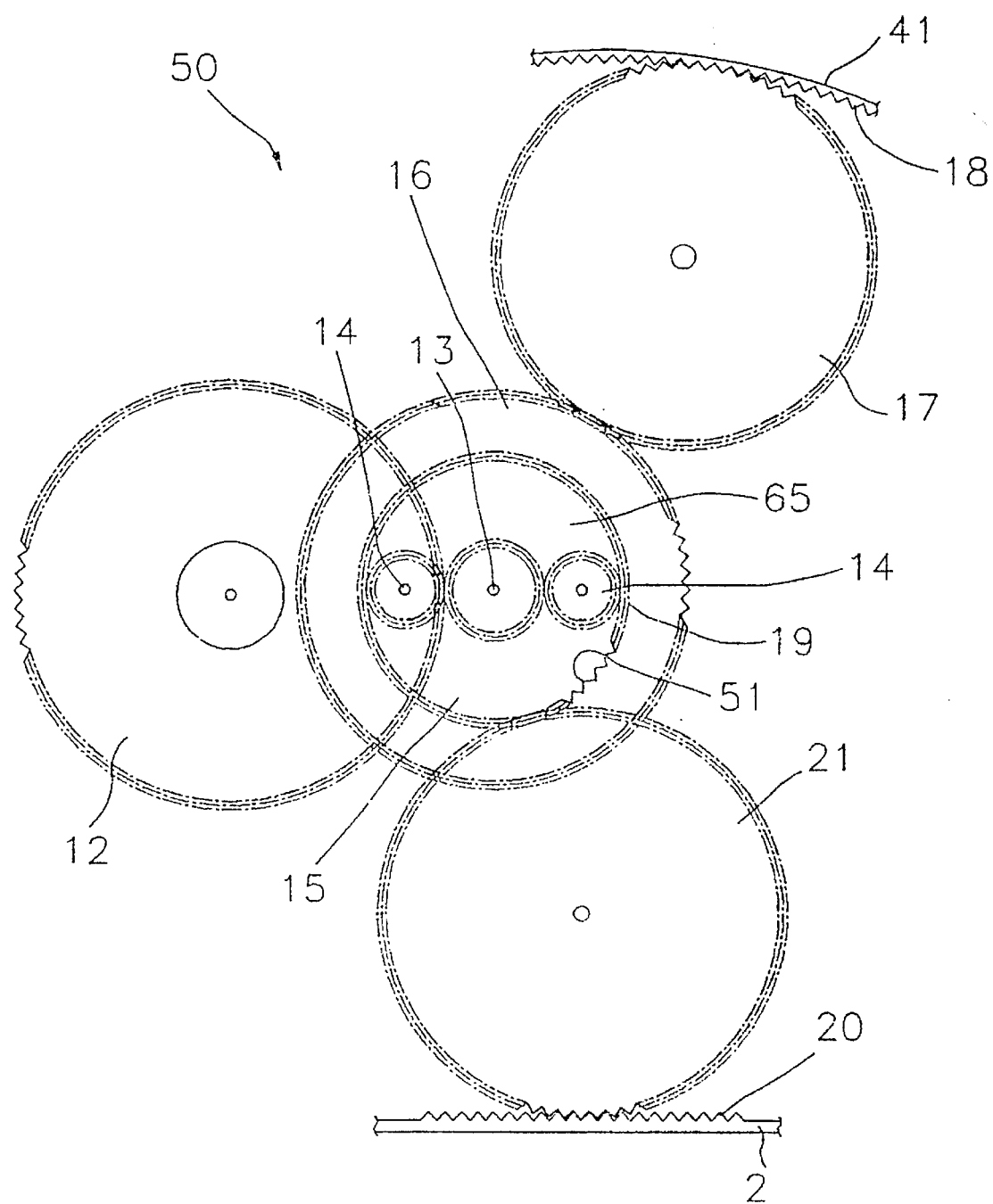
FIG. 4 is a schematic plan view of the tray/roulette driving mechanism shown in FIG. 2.

FIG. 2 is a cross-sectional view of a tray and roulette driving mechanism according to the present invention, and FIG. 4 is a schematic plan view of the tray and roulette driving mechanism shown in FIG. 2. As shown in FIGS. 2 and 4, the tray and roulette driving mechanism 50 of the disc changer according to one embodiment of the present invention includes a motor 9 for providing a driving force; a shaft gear 10 fixedly mounted to a shaft of the motor 9; a timing belt 11 for transmitting the driving force from the shaft gear 10; a wheel gear 12 being rotated by the driving force transmitted through the timing belt 11; a center gear 13 meshed with the wheel gear 12; an inner/outer gear 15 having a center hole 63 in a circular groove 65 formed thereon, and including an inner gear portion 51 and an outer gear portion 19 formed along inner and outer peripheries of inner/outer gear 15; a plurality of planet gears 14 each having a center groove 67, the planet gears 14 each mounted in circular groove 65 and meshed with center gear 13 and inner gear portion 51 of inner/outer gear 15 respectively; a roulette gear 16 having a plurality of protrusion 53 each being inserted into each of corresponding center grooves 67 of planet gears 14; and a tray driving gear 21 meshed with outer gear portion 19 of inner/outer gear 15 and a rack gear portion 20 of tray 2. Inner/outer gear 15 is rotatably inserted into the center shaft of roulette gear 16. Further, the plurality of planet gear 14 are engaged with center gear 13 through the center of shaft and the plurality of protrusions 53 of roulette gear 16, as shown in FIG. 2.

Operations of the disc changer with tray and roulette driving mechanism 50 having the above construction will be described in detail hereafter with reference to the accompanying drawings.

Figure 5:
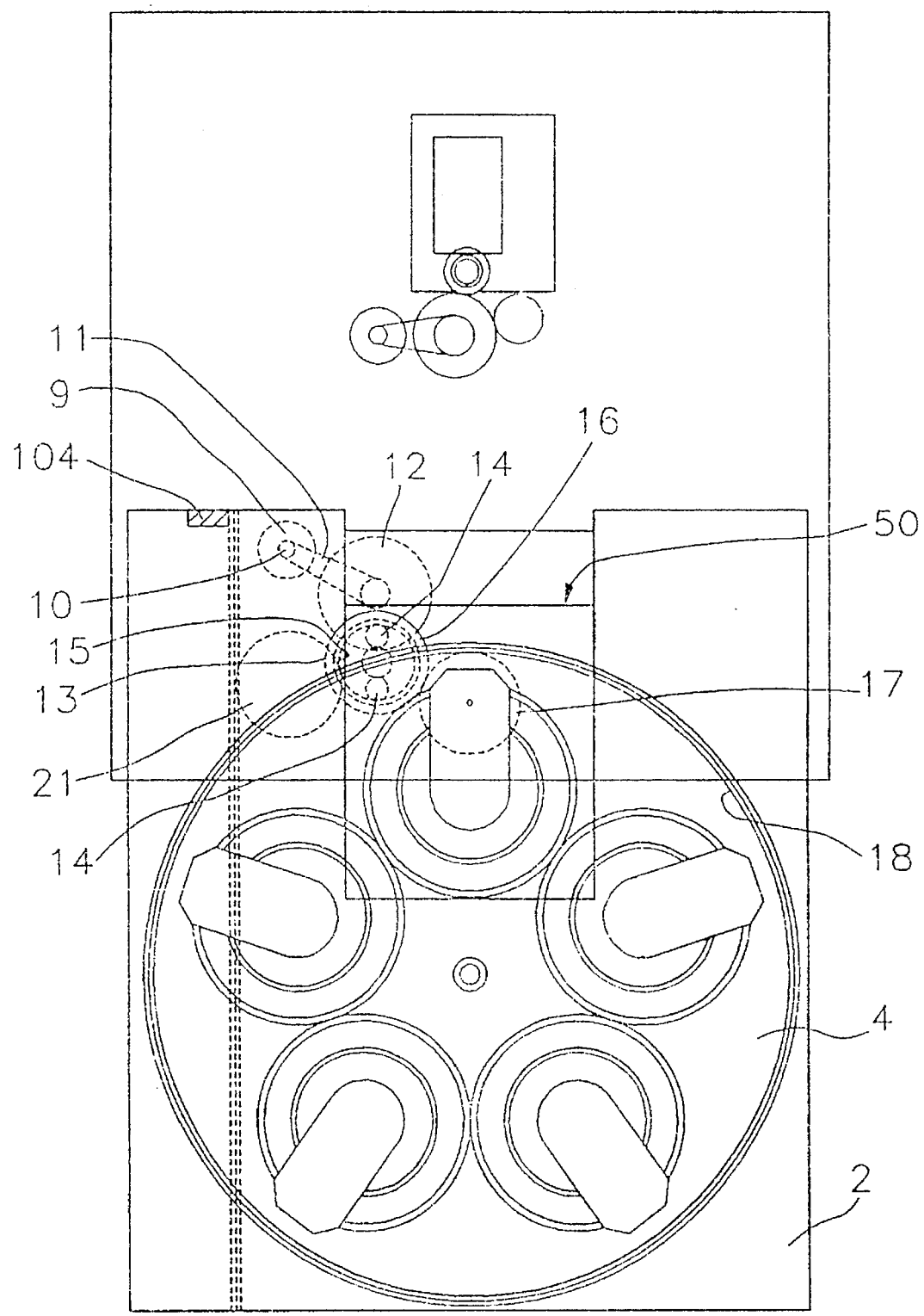
FIG. 5 is a view for explaining the operation of the disc changer when the tray is ejected in a frontward direction.

FIG. 5 is a view for explaining the operation of the disc changer when tray is ejected in frontward direction.

As shown in FIG. 5, the ejecting operation of tray 2 is completely stopped when tray 2 makes contact with a tray locking stopper 104. At this time, the roulette driving gear 17 of tray and roulette driving mechanism 50 is meshed with a rack gear portion 18 formed along the inner periphery of a skirt 41 extended downwardly from a bottom of roulette 4. Tray driving gear 21 is in a stationary state when tray 2 stops its ejecting operation. Therefore, inner/outer gear 15 stops its rotation since it is meshed with tray driving gear 21. However, since motor 9 continues to provide the driving force to tray and roulette driving mechanism 50, the driving force is transmitted to center gear 13 through wheel gear 12 so that plurality of planet gears 14 each engaged operatively with center gears 13 are rotated by themselves thereby to revolve around inner gear portion 51 formed along the periphery of inner/outer gear 15. Such rotation and revolution of planet gears 14 rotate roulette gear 16 since each of the protrusions 53 of roulette gear 16 is inserted to each of corresponding center grooves 67 of planet gears 14. The rotation of roulette gear 16 drives roulette driving gear 17 meshed with the rack gear portion 18 of roulette 4, so that roulette 4 is rotated.

With the complete ejection of tray 2 and the rotation of roulette 4, discs can be accommodated on and removed from roulette 4. When tray 2 is being retracted in rearward direction after discs have been accommodated on and removed from the roulette 4, as shown in FIG. 2, a protrusion 101 formed on the upper portion of roulette driving gear 17 is moving along a guide groove 102 formed on the lower surface of tray 2 to thereby prevent roulette driving gear 17 from being rotated during the retracting movement of tray 2. The movement of protrusion 101 along guide groove 102 is finished just before tray 2 is completely retracted in the rearward direction. Accordingly, protrusion 101 is out of guide groove 102 in a state that tray 2 is completely retracted in rearward direction, so that roulette driving gear 17 is able to be rotated to thereby rotate roulette 4 again.

As mentioned above, since roulette 4 is prevented from being rotated during the retracting movement of tray 2 so that roulette driving gear 17 meshed with rack gear portion 18 of roulette 4, and roulette gear 16 meshed with roulette driving gear 17 become, in turn, stationary. However, since motor 9 continues to providing the driving force to tray and roulette driving mechanism 50, the driving force is transmitted to center gear 13 through wheel gear 12 so that planet gears 14 are rotated by themselves to thereby rotate inner/outer gear 15. Due to the rotation of inner/outer gear 15, tray driving gear 21 meshed with the outer gear portion 19 of inner/outer gear 15 is rotated. Since tray driving gear 21 is also meshed with the rack gear portion 20 of tray 2, tray 2 is retracted in rearward direction.

Figure 6:
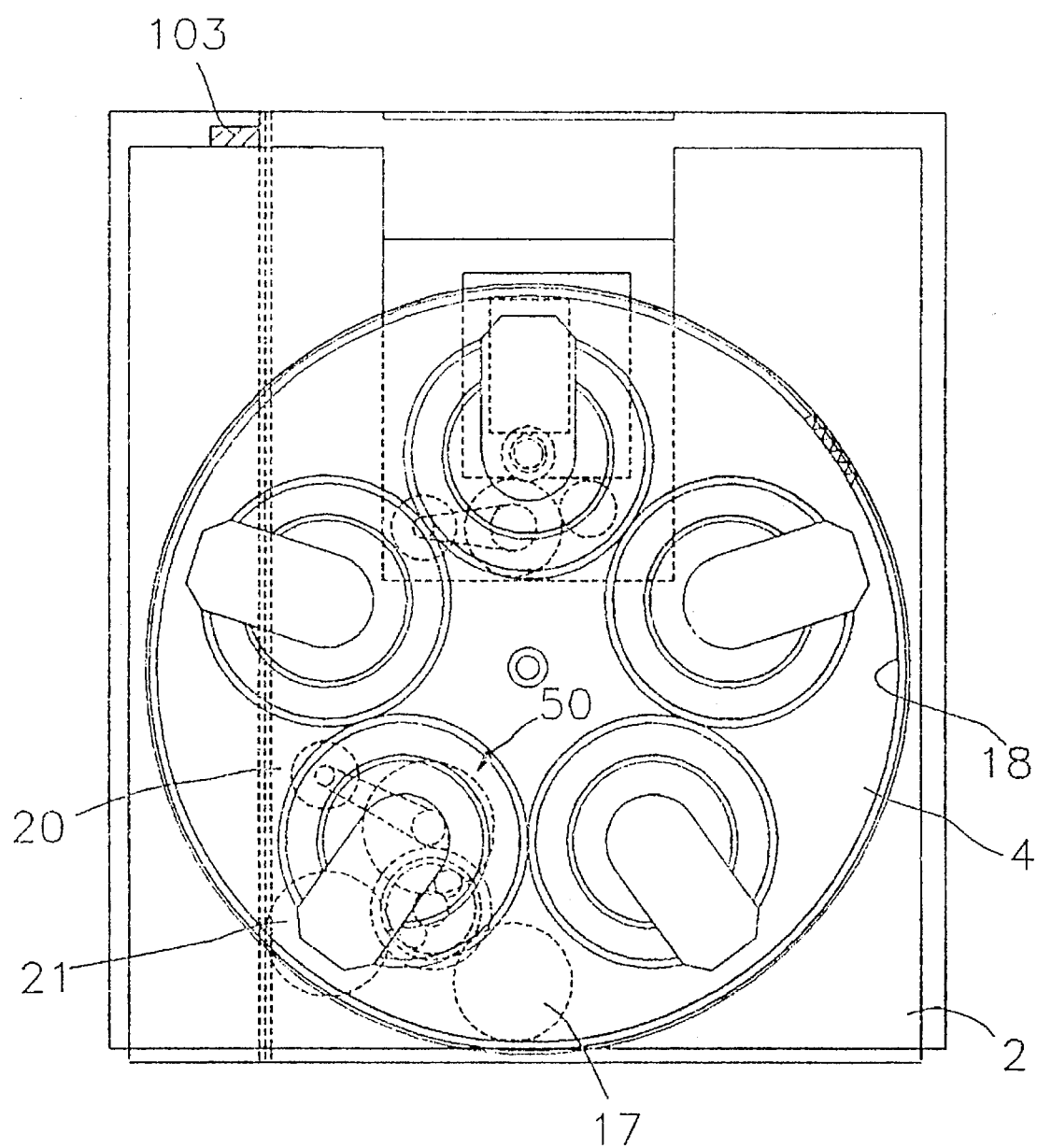
FIG. 6 is a view for explaining the operation of the disc changer when the tray is retracted in a rearward direction.

FIG. 6 is a view for explaining the operation of the disc changer when tray 2 is retracted in rearward direction in the disc changer according to one embodiment of the present invention.

As shown in FIG. 6, the retracting operation of tray 2 is completely finished when tray 2 is contacted with a tray locking stopper 103. At this time, the tray driving gear 21 of tray and roulette driving mechanism 50 which is meshed with the rack gear portion 20 of tray 2, is in a stationary state when tray 2 stops its retracting operation. Roulette driving gear 17 is meshed with rack gear portion 18 formed along an inner periphery of skirt 41 of roulette 4. Therefore, tray and roulette driving mechanism 50 rotates roulette 4 in the same operations as when tray 2 is completely ejected, thereby selecting a desired disc from a plurality of discs accommodated.

When tray 2 moves from a complete retraction to complete ejection, as previously mentioned and as shown in FIG. 2, protrusion 101 formed on the upper portion of roulette driving gear 17 is moving along guide groove 102 formed on the lower surface of tray 2 to thereby prevent roulette driving gear 17 from being rotated during the ejecting movement of tray 2. The movement of protrusion 101 along guide groove 102 is finished just before tray 2 is completely ejected in frontward direction.

Figure 3:
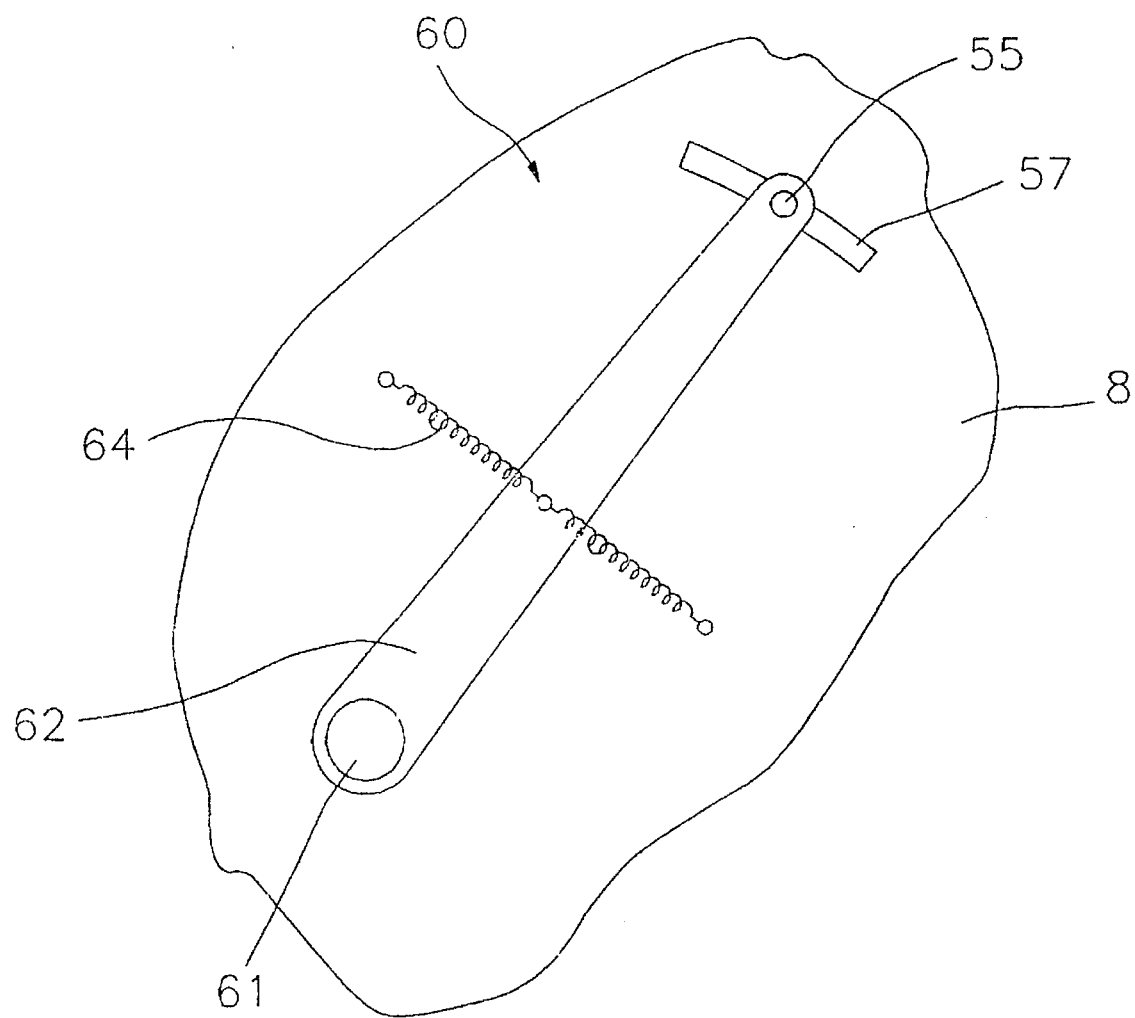
FIG. 3 is a cross-sectional view of a teeth-matching unit taken along a line denoted by A—A in FIG. 2.

FIG. 3 is a cross-sectional plan view of teeth matching unit taken along a line denoted by arrows A—A in FIG. 2.

Roulette driving gear 17 becomes meshed with rack gear portion 18 of roulette 4 when tray 2 has been completely ejected or retracted. Teeth matching unit 60 operates in order for roulette driving gear 17 to become correctly meshed with rack gear portion 18 of roulette 4 when tray 2 has been completely ejected or retracted. Teeth matching unit 60 includes a teeth matching member 62 in which one end portion is rotatably inserted into a lower portion 61 of the center shaft of center gear 13 and in which the other end portion is inserted into a lower portion 55 of center shaft of roulette driving gear 17; a spring 64 in which ends are fixed on a base 8 and in which middle portion is fixed to teeth matching member 62; and an arc-shaped groove 57 formed on base 8 in order for lower portion 55 of the center shaft of roulette driving gear 17 to slide therein. With the structure of teeth matching unit 60 mentioned above, when roulette driving gear 17 is not meshed exactly with rack gear portion 18 of roulette 4, teeth matching member 62 pivotally moves by elastic force of spring 64 so that lower portion 55 of roulette driving gear 17 is slid along arc-shaped groove 57, thereby accomplishing exact teeth-matching between roulette driving gear 17 and rack gear portion of roulette 4.

As described above, a disc changer according to the present invention enables a tray and a roulette to be driven by one motor to thereby reduce a product cost and a size thereof.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. A disc changer including a tray driven in frontward and rearward directions and a roulette rotatably mounted on the tray and capable of carrying a plurality of discs so that a desired disc is selected to be played back, said disc changer comprising:

means for providing a driving force; and means for driving said tray and said roulette in accordance with said driving force of said driving force providing means, wherein said tray and roulette driving means includes:

a shaft gear fixedly mounted to a shaft of said driving force providing means;

a timing belt for transmitting the driving force from said shaft gear;

a wheel gear being rotated by said driving force transmitted through said timing belt;

a center gear meshed with said wheel gear;

an inner/outer gear having a center hole in a circular groove formed thereon, and including an inner gear portion and an outer gear portion formed along inner and outer peripheries thereof;

a plurality of planet gears each having a center groove, said planet gears each being mounted in said circular groove and meshed with said center gear and said inner gear portion of said inner/outer gear respectively;

a roulette gear, having protrusions being correspondingly inserted into each of said center grooves of said planet gears, for driving a roulette driving gear that rotates said roulette; and a tray driving gear meshed with said outer gear portion of said inner/outer gear and a rack gear portion of said tray for driving said tray.

2. The disc changer as claimed in claim 1, wherein said roulette includes a rack gear portion on a skirt downwardly extended from a lower periphery of said roulette.

3. The disc changer as claimed in claim 1, wherein said driving force providing means is a motor.

4. A disc changer for playing back a desired disc of a plurality of accommodated discs, said disc changer comprising:

means for providing a driving force;

a tray having a rack gear portion on one side and a longitudinal guide groove on a lower surface thereof, for moving a roulette in frontward and rearward directions, said roulette having a rack gear portion formed along an inner periphery of a skirt downwardly extended from a bottom thereof;

a roulette driving gear meshed with said rack gear portion of said roulette and having a protrusion on an upper portion thereof for preventing said roulette from being rotated, said protrusion being inserted in said guide groove of said tray when said tray moves in frontward and rearward directions;

a tray driving gear meshed with said rack gear portion of said tray;

teeth matching means for adjusting a teeth mismatch and matching said rack gear portion of said roulette with said roulette driving gear;

means for driving said tray and said roulette by driving said tray driving gear and said roulette driving gear in accordance with said driving force of said driving force providing means;

wherein said tray and roulette driving means includes:

a shaft gear fixedly mounted to a shaft of said driving force providing means;

a timing belt for transmitting the driving force from said shaft gear;

a wheel gear being rotated by said driving force transmitted through said timing belt;

a center gear meshed with said wheel gear;

an inner/outer gear having a center hole in a circular groove formed thereon, and including an inner gear portion and an outer gear portion formed along inner and outer peripheries thereof, the outer gear portion driving the tray driving gear;

a plurality of planet gears each having a center groove, said planet gears each being mounted in said circular groove and meshed with said center gear and said inner gear portion of said inner/outer gear respectively; and a roulette gear having protrusions being correspondingly inserted into each of said center grooves of said planet gears for driving the roulette driving gear.

5. The disc changer as claimed in claim 4, wherein said teeth matching means includes:

a teeth matching member in which one end portion is rotatably inserted into a lower portion of a center shaft of said center gear and another end portion is inserted into a lower portion of a center shaft of said roulette driving gear;

an elastic member having ends fixed on a base and a middle portion fixed to said teeth matching member; and an arc-shaped groove formed on said base in order for said lower portion of said center shaft of said roulette driving gear to slide therein.

6. The disc changer as claimed in claim 5, wherein said elastic member is a spring.

7. The disc changer as claimed in claim 4, wherein said driving force providing means is a motor.

* * * * *